Patented Nov. 19, 1940

2,221,915

UNITED STATES PATENT OFFICE 2,221,915

PROCESS FOR THE MANUFACTURE OF AMINOARYL SULPHONES

Friedrich Felix, Basel, Rudolf von Capeller, Riehen, and Richard Sallmann, Arlesheim, Switzerland, assignors to the firm of Society of Chemical Industry in Basle, Basel, Switzerland No Drawing. Application May 20, 1937, Serial No. 143,846. In Switzerland May 26, 1936

2 Claims. (Cl. 260—531)

This invention relates to the manufacture of aminoaryl sulphones by treating with ammonia under pressure an aryl sulphone which contains a halogen atom in the nucleus but no nitrogroup.

The aminoaryl sulphone is obtained in good yield and the process attains the object in most cases without the use of alcohol or another solvent. The conditions of temperature and pressure must be selected in each case to suit the nature of the parent material. According to the number of substituents, for instance, further sulphone groups, sulphonic acid groups, which affect the reactivity of the halogen atom that is to be exchanged, the temperature of the reaction and the proportion of ammonia must be duly selected. In certain cases it is of advantage to operate in the presence of a catalyst, for example a metal salt, copper, a salt of copper or the like. The process renders easily accessible a series of sulphones, especially from those which contain the exchangeable halogen atom in ortho- or para-position to the sulphone group, for example 1-aminophenyl-2-alkyl sulphones, 1-aminophenyl-2-aralkyl sulphones and 1-aminophenyl-2-aryl sulphones, for example 1-aminophenyl-2-methyl-, 2-ethyl- or 2-propylsulphone, 1-aminophenyl-2-benzyl sulphone, 1-aminophenyl-2-phenyl sulphone, 1-aminophenyl-2-methylphenyl sulphone; also the corresponding 1-aminophenyl-4-alkyl-, aralkyl- and arylsulphones, for instance 1-aminophenyl-4-ethyl sulphone, 1-aminophenyl-4-benzyl sulphone.

These sulphones may also carry further substituents, for instance alkyl groups, hydroxyalkyl groups, sulphonic acid groups or further sulphone groups, sulphamide groups, further halogen atoms. 1-aminophenyl-2,4-dialkyl disulphones are especially easily made, for example 1-aminophenyl-2,4-dimethyl disulphone, 1-aminophenyl-2,4-diethyl disulphone, 1-aminophenyl-2,4-dibenzyl disulphone. Disulphones may also be obtained which contain different sulphone groups, for instance 1-aminophenyl-2-benzyl-4-ethyl disulphone or 1-aminophenyl-2-ethyl-4-phenyl disulphone. In each case the corresponding 1-halogen compound serves as parent material, the chlorine or bromine derivative being used.

The following example illustrates the invention:

30 parts by weight of 1-chlorophenyl-2,4-diethyl disulphone, 150 parts of an ammonia solution of 24 per cent. strength and 100 parts of alcohol are heated together at 130–135° C. for 10–20 hours in a closed vessel. By distilling the alcohol the 1-aminophenyl-2,4-diethyl disulphone is obtained; if desired this can be purified by crystallization from alcohol.

In like manner the following chlorine derivatives can be converted into the corresponding amino-sulphones:

1-chlorophenyl-2,4-dimethyl disulphone
1-chlorophenyl-2,4-dipropyl disulphone
1-chlorophenyl-2,4-dibutyl disulphone
1-chlorophenyl-2,4-dibenzyl disulphone
1-chlorophenyl-2-benzyl-4-ethyl disulphone In making amino-mono-sulphones, for instance 1-aminobenzene-4-ethyl sulphone from 1-chlorobenzene-4-ethyl sulphone, it is preferable to operate at a high temperature which may be, for instance, between 150° C. and 180–200° C., and under pressure, which may amount to 90–100 atmospheres. This excess pressure may best be produced by forcing ammonia into the vessel during the reaction, if desired in presence of a catalyst, such as a copper compound or metallic copper.

What we claim is:

1. Process for the manufacture of aminoaryl sulphones of the benzene series, comprising treating compounds of the formula

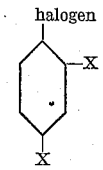

wherein X is one of the group consisting of hydrogen and SO$_2$R, at least one X being SO$_2$R, and R is one of the group consisting of lower alkyl, benzyl and aryl of the benzene series, with ammonia under superatmospheric pressure up to 100 atm. at temperatures between 130 and 200° C.

2. Process for the manufacture of aminoaryl sulphones of the benzene series, comprising treating compounds of the formula

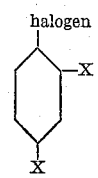

wherein X is one of the group consisting of hydrogen and SO$_2$R, at least one X being SO$_2$R, and R is one of the group consisting of lower alkyl, benzyl and aryl of the benzene series, with ammonia under superatmospheric pressure up to 100 atm. and copper as catalyst at temperatures between 130 and 200° C.

FRIEDRICH FELIX.
RUDOLF VON CAPELLER.
RICHARD SALLMANN.